US006505182B1

(12) United States Patent
Van den Heuvel

(10) Patent No.: US 6,505,182 B1
(45) Date of Patent: Jan. 7, 2003

(54) RECOGNITION ENGINE WITH TIME REFERENCED NEURONS

(76) Inventor: Raymond C. Van den Heuvel, 18618 Celtic St., Northridge, CA (US) 91326

(*) Notice: Subject to any disclaimer, the term of this patent is extended or adjusted under 35 U.S.C. 154(b) by 0 days.

(21) Appl. No.: 09/169,474

(22) Filed: Oct. 9, 1998

(51) Int. Cl.[7] .............................................. G06F 15/18
(52) U.S. Cl. ........................................ 706/41; 706/34
(58) Field of Search ..................... 706/41, 34

(56) References Cited

U.S. PATENT DOCUMENTS

| | | | | |
|---|---|---|---|---|
| 5,140,538 A | * | 8/1992 | Bass et al. ...................... 708/3 |
| 5,506,915 A | * | 4/1996 | Takstori et al. ............... 706/20 |
| 5,671,336 A | * | 9/1997 | Yoshida et al. ............... 706/30 |
| 5,875,439 A | * | 2/1999 | Engel et al. ................... 706/41 |

OTHER PUBLICATIONS

Hikawa, H., "Learning Performance of Frequency–Modulation Digital Neural Network With On–Chip Learning", IEEE Neural Network Proceedings on International Joint Conference on Computational Intelligence, May 1998.*

Chen et al, "Hybrid Architecture for Analogue Neural Network and Its Circuit Implementation", IEE Proceedings on Circuits, Devices and Systems, Apr. 1996.*

Miura et al, "A Magnetic Neural Network, Utilizing Universal Arithmetic Modules for Pulse–Train Signal. Processing" IEEE Inter. Conf. on System Engineering, Sep. 1992.*

* cited by examiner

Primary Examiner—George B. Davis

(57) ABSTRACT

Detection is implemented by a multiplier, a lookup table or other apparatus with two inputs, one of which typically receives an input signal from a sensor, and the other a reference or weighting factor W stored or generated locally. The detected value is added to the contents of a memory location A after the previous contents of memory locations A have been modified by a loss or gain factor Q. Memory location A is one of several such memory locations in a shared memory simultaneously accessible by an external user. In a neural engine the memory locations represent neurons. For each cycle of operation of the neural engine a new value of W, Q and A are provided.

20 Claims, 2 Drawing Sheets

RECOGNITION ENGINE WITH TIME REFERENCED NEURONS

CROSS-REFERENCES BY THE SAME AUTHOR

U.S. Pat. No. 4,809,222: Associative and Organic Memory and Methods. Filed Jun. 20, 1986, Issued Feb. 28, 1989.

U.S. Pat. No. 4,984,176: The VDH Biocomputer. Filed Jan. 11, 1988, Issued Jan. 8, 1991.

U.S. Pat. No. 5,375,250: Method of Intelligent Computing and Neural-Like Processing of Time and Space Functions. Filed Jul. 13, 1992, Issued Dec. 20, 1994.

U.S. Pat. No. 5,503,161: Universal Medical Instrument Based on Spectrum Analysis. Filed Oct. 25, 1993, Issued Apr. 2, 1996.

BACKGROUND

U.S. Pat. No. 4,809,222: Associative and Organic Memory and Methods, filed Jun. 20, 1986 and issued Feb. 28, 1989 documents an exploration of "intelligence" in computers. One of the references cited was an article entitled "Neural Networks are Naive, Says Minsky." In 1986 the experts were pondering the potential of neurocomputing and the meaning of the word "intelligence." The invention's contribution was a "memory that can forget." This led to a neural network with surprising abilities, for instance changing priorities and real-time frequency spectrum analysis without the painful computations and memory requirements. Even though the proposed embodiment used analog circuits, the claims allowed for the use of digital circuits—for instance multipliers—"when they become available".

U.S. Pat. No. 4,984,176: The VDH Biocomputer, filed Jan. 11, 1988 and issued Jan. 8, 1991, further explored the requirements of a computer for "intelligence." The issue of software was also explored. The main idea was to minimize the added hardware and software complexity when the scale and scope of the applications increase.

U.S. Pat. No. 5,375,250: Method of Intelligent Computing and Neural-Like Processing of Time and Space Functions, filed Jul. 13, 1992 and issued Dec. 20, 1994, redefines the hardware used in the previous patent and further elaborates on the functions that can be performed in real time by the neural network first introduced in U.S. Pat. No. 4,809,222 (Associative and Organic Memory and Methods.) Algorithms—heuristic searches, back propagation of errors, etc.—that are used in more conventional neural networks apply but were not elaborated on. In this patent the neural engine was renamed "Resonant Processor."

U.S. Pat. No. 5,503,161: Universal Medical Instrument Based on Spectrum Analysis, filed Oct. 25, 1993 and issued Apr. 2, 1996, shows how spectrum analysis—of light, sound and chemicals—can play a key role in devising a universal instrument for medicine, and how this instrument's general usefulness in medicine could be compared to that of the oscilloscope in electronics. In order to fully appreciate the timeliness of this patent, it is advisable not to skip the section entitled "Background of the Invention." The citations cover a range of social and technical requirements. It promotes a paradigm where resources are concentrated on the practitioner at the bedside. This patent was written after the author had actually built a working version of his neural network and demonstrated that it actually works for real-time frequency spectrum analysis. By now the neural engine was variously referred to as a "resonant processor," a biocomputer" or an "artificial cochlea" when programmed to work like the inner ear.

SUMMARY

The apparatus of the Claims that follow is the same as that used in the neural engine of the previously referenced patents by the same author, but with further modifications and/or additions. All versions make it possible to realize a neural network with neurons that are capable of storing a multivalued quantity, said multivalued quantity also being able to grow or decay as a function of time.

In a first aspect, whereas the previous patents did describe a general methodology for performing frequency spectrum analysis, the present invention provides a number of additional hardware and software enabling details.

In a second aspect, whereas the previous versions used two multipliers and one adder to perform arithmetic, the present invention replaces one of the multipliers with a Coincidence Detector (3), thus significantly expanding the scope and capabilities of the neural recognition engine in areas other than frequency spectrum analysis.

DETAILED DESCRIPTION

Figure 1:
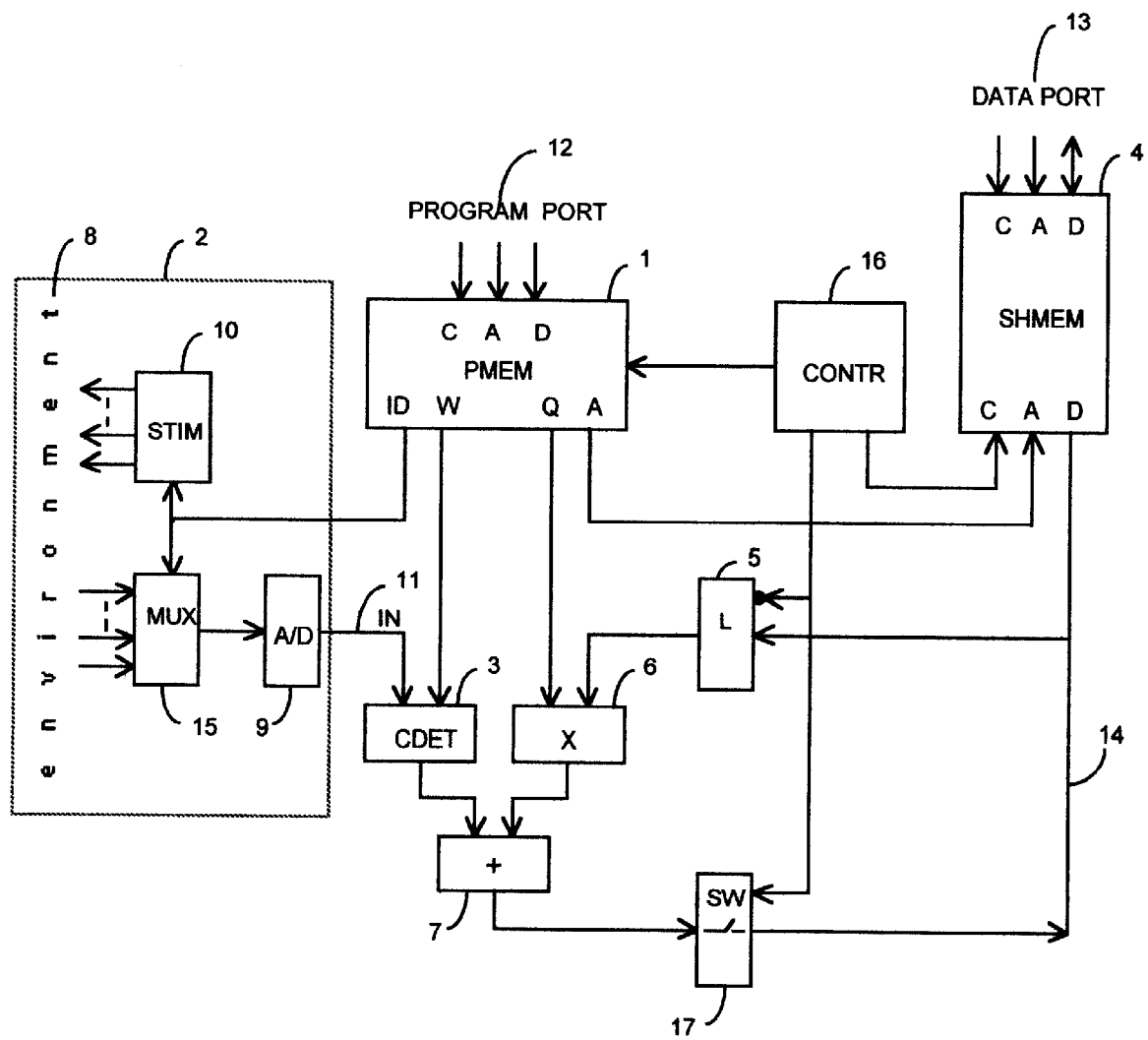
FIG. 1 is a block diagram of the canonical or preferred version of the recognition engine.

In what follows, the present version of the neural engine of the invention will be referred to as a Time-Referenced Neural Network (TRNN). A block diagram of the preferred embodiment of the TRNN is shown in FIG. 1.

The TRNN uses long words, called control words, to control each cycle of operation. These control words could be compared to "instructions" and correspond to "microcode" in standard processors. As in microprocessors, each control word controls one cycle of operation. Each control word typically includes a plurality of bits to specify the origin or identity ID of the input signal, a plurality of bits to describe the value of a weighting factor W, a plurality of bits to describe the value of a gain or or loss factor Q, and a plurality of bits to describe the address A of a given neuron.

In what follows quantities ID, W, Q and A will also be referred to as parameters and weighting factor W will additionally be referred to as an analyzing function, a reference function or even a local reference signal, depending on the aspect being discussed. The following is a simplified example of a single control word and the assignments of the binary bits (ones and zeros) within it:

| C16 | C15 | C14 | C13 | C12 | C11 | C10 | C9 | C8 | C7 | C6 | C5 | C4 | C3 | C2 | C1 | C0 |
|---|---|---|---|---|---|---|---|---|---|---|---|---|---|---|---|---|
| ID1 | ID0 | W6 | W5 | W4 | W3 | W2 | W1 | W0 | Q4 | Q3 | Q2 | Q1 | Q0 | A2 | A1 | A0 |

Two bits, C15 and C16, (four possible values) have been assigned to the ID parameter; seven bits, C8 to C14 (or 128 possible values) to the W parameter; five bits, C3 to C7, (32 possible values) to the Q parameter and three bits, C0 to C2 (8 possible values) to the A parameter. The control words are generated, copied or stored after compilation in function block (1). In the preferred embodiment function block (1) simply consists of a lookup table or a Program Memory.

Function block (2) provides an input (11) that is connected to one or a plurality of signal sources. In the case of frequency spectrum analysis, for example, a single wire might be all that is necessary. When a plurality of sources are used, as is more generally the case in neural networks, and/or when it is necessary to convert from analog to digital formats (or vice-versa) additional circuits will be needed, for instance a Multiplexer (15) and an Analog to Digital converter (9). Outside sources (8) can include one or more external memories, sensors or circuits. Since not all environmental sources spontaneously generate electrical potentials (for instance if the parameter of interest is an impedance), it is sometimes also necessary to provide a "stimulus" in the form of an energizing voltage or current. This is accomplished by means of Stimulator (10). The origin of the signal and the nature of the stimulus are controlled by the ID portion of the control word. The ID parameter can also contain an address.

Coincidence Detector (3) is a novel feature of the present invention. It is a more generic (as opposed to specialized) function block that produces a high value result when the input values (11) and W are approximately equal and a low value result when that is not the case. Many hardware means and software algorithms can perform this function. When a measure of noise or difference is required, a simple subtractor will do. When a measure of proximity in needed, an algorithm which approximates the inverse of the absolute value of the difference between the two inputs might be appropriate. Instead of the hyperbolic function that results from computing the inverse of the difference of two inputs, an alternate method can be used to generate a "Gaussian" response curve or its equivalent. Since the computation might be too time-consuming, a lookup table with precomputed results is often preferable. Coincidence between two inputs can also be computed by multiplying them together, as is often done in synchronous detection. Multipliers are very good in comparing sinusoidal functions generally, since the values of the product are positive when they coincide and negative when they are 180 degrees out of phase. When the inputs are sinusoidal functions whose frequencies differ substantially, the average or DC value of the product tends toward zero. In Engineering, the less precise word "detector" is often used in lieu of "multiplier."

Shared Memory (4) contains one or more neurons each consisting of a memory element in which is stored a quantity with a plurality of possible values. Shared Memory (4) can be a regular Static Read Only Memory (SRAM) but a dual-ported version is normally preferred, because it allows a user, for instance a CPU, to read its contents without causing delays or otherwise interfering with the circuits of the TRNN neural engine. In some cases, one or more discrete digital registers may be preferred, or analog components or circuits, for instance capacitors or integrators. A capacitor has the advantage that parameter Q can be implemented as a resistor in parallel (variable or not, under control of the control word, or by some other means. (See the referenced patents by the same author.) The A portion of the control word allows access to or selects a particular memory element or location. It is what is known as an "address." In what follows, parameter A will also serve as the identifier (or name) of the neuron at that address.

Latch means (5) connected to the data bus (14) of Shared Memory (4) holds the original quantity stored in neuron A at the beginning of the machine cycle of the neuron, before the computations to modify the contents of a neuron are begun. A common digital latch can perform that function. In the case of analog circuits, a capacitor might be chosen as the storage element.

Multiplier (6) or some other appropriate means is used to cause a growth or a decay in the quantity stored in the neuron. Normally parameter Q is less than 1 (unity) to cause a decay. Multiplier (6) is typically a digital multiplier but can also consist of an analog multiplier or a simple resistor across a capacitive memory element. An alternative method of causing the quantity stored by a neuron to grow or decay is to add or subtract from it a smaller quantity, one that is equal to the previous contents of the neuron divided by a constant. This alternative method does have the advantage that a precision multiplier is not needed.

Adder (7) is used to add the outputs of Coincidence Detector (3) and Multiplier (6). A standard arithmetic circuit can be used for the purpose. The result of the addition is the new value that will be stored in the neuron at the end of the TRNN machine cycle.

Control Circuits (16) consist of ordinary logic elements. They control the operation of the various function blocks and the sequence of events in the TRNN. They include switch (17) for connecting the output of adder (7) to the data bus (14) of Shared Memory (4) when the updated value is stored back in the neuron.

Programming of the TRNN typically would consists of storing parameters ID, W, Q and A in Program Memory (1). As has already been said, in the preferred case function block (1) is a lookup table and memory (4) a shared, dual or even multi-ported memory. Both function blocks (1) and (4) can be accessed by the user of the TRNN (typically a CPU or microcontroller) through Program Port (12) and Data Port (13). Shared Memory (4) is "transparently accessible" in such a way as to not interfere with the timing of the TRNN when it is actively processing inputs. This is a technique well-known in the art.

The hardware used in the TRNN can be modified so that several sub-units, each a complete TRNN, are working concurrently ("in parallel") and in layers ("in series") with the outputs (neurons) of a previous layer connected to the inputs of the next. More on that later.

Coincidence Detector (3) is especially useful when dealing with non-periodic signals. However with non-periodic signals the relative time-delays between the input at (11) and the weighting factor W used as a reference represent a "misalignment" that can cause an input sequence of interest to go undetected. An additional solution is then needed. One such solution is to use a plurality of neurons, each associated with an identical copy of the reference waveform W, each copy of the reference sequence or waveform however being offset in amplitude and/or time from the other by a different amount. Another, less elegant solution is to repeat the input signal, each time varying the relative time delay. It is also possible to wait until an unusual or distinctive input signal feature is detected, for instance a maximum or minimum, before initiating a sequence of TRNN machine cycles in which the W factors sequence is related to the input sequence of samples to be recognized.

In recognition tasks, the output of a neuron typically indicates the likelihood of the existence of a given "feature" in the input signal at (11). The more general significance of parameter Q is that it determines how a detected feature stored in a given neuron gains or loses importance with the passage of time. When Q is less than unity, "obsolescence" takes care of "phasing it out" the feature and when it is greater than unity, the "priority" of the feature increases with the passage of time. This ability to change priorities as a function of time can help resolve conflicts when there is more than one possible choice of action. And, as will be seen later, the automatic obsolescence of detected stimuli in the TRNN is what makes the TRNN so well adapted for Frequency Spectrum Analysis. More on that later.

One machine cycle of the TRNN engine takes care of the relevant computations for one weight and the associated neuron. Taking into account the present state of the art, a TRNN engine like the one illustrated in FIG. 1 is capable of between 10 and 100 million machine cycles per second when digital circuits are used exclusively.

A typical sequence for one machine cycle includes one signal sample, one coincidence detection, one memory read, one multiplication, one addition and one memory write operation. First the value stored in neuron A is latched in Latch (5). That value is referred to as the previous value of the neuron. Then Coincidence Detector (3) generates an output indicative of the closeness between the input at (11) and parameter W at the same time that Multiplier (6) generates the product of the previous value of the neuron and parameter Q. Adder (7) generates the sum of the outputs of Coincidence Detector (3) and Multiplier (6). This sum represents the updated value of the neuron and is finally stored back at the same address in Shared Memory (4).

Circuit variations are possible. For instance, Latch (5) can be interchanged with switch (17). The sequence of events is then somewhat different. First switch (17) is closed and the value at input (11) is processed in Coincidence Detector (3) at the same time that the original or previous contents of Shared Memory (4) are multiplied by parameter Q. The output of Coincidence Detector (3) and Multiplier (6) are then added in Adder (7) and temporarily stored in Latch (5). Finally the contents of Latch (5) are stored back in Shared Memory (4) at address A.

Another circuit variation makes it possible to acquire a new sample and hold it constant at input (11) for a number of TRNN machine cycles. To this end, Analog to Digital converter means (9) can include an output register. This feature is commonly available in state of the art Analog to Digital Converters. If the signal is already in the desired format (i.e., analog or digital) then a simple holding register will suffice. A new sampling clock signal is then provided, typically by Program Memory (1) or Control means (16) (see later) which is asserted (becomes true) each time it is desired to acquire and/or convert an input sample and update the value of the input data at (11).

The following example illustrates a typical sequence of operations in a TRNN programmed for frequency spectrum analysis. In this kind of application the Coincidence Detector is typically a multiplier. In frequency spectrum analysis it is often convenient to think in terms of "frequency channels." Briefly stated, a frequency channel includes the means for detecting a single given frequency, and the center frequency is that of the associated weighting factors. For simplicity, it is assumed that there are only three frequency "channels" whose center frequencies are $F_1$, $F_2$ and $F_3$. Assume further that the TRNN begins a machine cycle at times t=1, t=2, t=3, etc. and that input samples $S_1$, $S_2$, $S_3$ ... $S_n$ are obtained from the (real time) output of a microphone at times t=1, t=12, t=23 etc. (in other words, once every 11 TRNN machine cycles.) The general requirements are:

| | | | |
|---|---|---|---|
| At time t = 1, | $S = S_1$ and $W = W1 = K_1 \sin(2\pi * F_1 * t_1)$ | Q = Q1 | A = A1 |
| At time t = 2, | $S = S_1$ and $W = W2 = K_1 \cos(2\pi * F_1 * t_1)$ | Q = Q1 | A = A2 |
| At time t = 3 | $S = S_1$ and $W = W3 = K_2 \sin(2\pi * F_2 * t_1)$ | Q = Q2 | A = A3 |
| At time t = 4 | $S = S_1$ and $W = W4 = K_2 \cos(2\pi * F_2 * t_1)$ | Q = Q2 | A = A4 |
| At time t = 5 | $S = S_1$ and $W = W5 = K_3 \sin(2\pi * F_3 * t_1)$ | Q = Q3 | A = A5 |
| At time t = 6 | $S = S_1$ and $W = W6 = K_3 \cos(2\pi * F_3 * t_1)$ | Q = Q3 | A = A6 |
| At time t = 7 | (Do something else) | | |
| At time t = 8 | (Do something else) | | |
| At time t = 9 | (Do something else) | | |
| At time t = 10 | (Do something else) | | |
| At time t = 11 | (Do something else) | | |
| At time t = 12, | $S = S_2$ and $W = W12 = K_1 \sin(2\pi * F_1 * t_{12})$ | Q = Q1 | A = A1 |
| At time t = 13, | $S = S_2$ and $W = W13 = K_1 \cos(2\pi * F_1 * t_{12})$ | Q = Q1 | A = A2 |
| At time t = 14 | $S = S_2$ and $W = W14 = K_2 \sin(2\pi * F_2 * t_{12})$ | Q = Q2 | A = A3 |
| At time t = 15 | $S = S_2$ and $W = W15 = K_2 \cos(2\pi * F_2 * t_{12})$ | Q = Q2 | A = A4 |
| At time t = 16 | $S = S_2$ and $W = W16 = K_3 \sin(2\pi * F_3 * t_{12})$ | Q = Q3 | A = A5 |
| At time t = 17 | $S = S_2$ and $W = W17 = K_3 \cos(2\pi * F_3 * t_{12})$ | Q = Q3 | A = A6 |
| At time t = 18 | (Do something else) | | |
| At time t = 19 | (Do something else) | | |
| At time t = 20 | (Do something else) | | |
| At time t = 21 | (Do something else) | | |
| At time t = 22 | (Do something else) | | |
| At time t = 23, | $S = S_3$ and $W = W23 = K_1 \sin(2\pi * F_1 * t_{23})$ | Q = Q1 | A = A1 |
| At time t = 24, | $S = S_3$ and $W = W24 = K_1 \cos(2\pi * F_1 * t_{23})$ | Q = Q1 | A = A2 |

-continued

| | | | |
|---|---|---|---|
| At time t = 25 | S = S$_3$ and W = W25 = K$_2$sin(2π * F$_2$ * t$_{23}$ ) Q = Q2 | A = A3 |
| At time t = 26 | S = S$_3$ and W = W26 = K$_2$cos(2π * F$_2$ * t$_{23}$ ) Q = Q2 | A = A4 |
| At time t = 27 | S = S$_3$ and W = W27 = K$_3$sin(2π * F$_3$ * t$_{23}$ ) Q = Q3 | A = A5 |
| At time t = 28 | S = S$_3$ and W = W28 = K$_3$cos(2π * F$_3$ * t$_{23}$ ) Q = Q3 | A = A6 |
| At time t = 29 | (Do something else) | |
| At time t = 30 | (Do something else) | |
| At time t = 31 | (Do something else) | |
| At time t = 32 | (Do something else) | |
| At time t = 33 | (Do something else) | |

. . . and so on, in a repeating pattern. The ID parameter is not shown here because there is only one source of signals and so the ID parameter is used only to supply the sample clock. Parameter ID is then a "one" (true) when it is desired to update the input signal at (11) and a "zero" (false) otherwise. Note that two neurons are used for each frequency of interest, one for input signal components that are in phase, and one for input signals in quadrature of phase. The reason for this will become clear later. Suffice it to say that for the above example, the contents (shown one line per control word) of Program Memory (1) will be as follows:

ID/W1/Q1/A1
ID/W2/Q1/A2
ID/W3/Q2/A3
ID/W4/Q2/A4
ID/W5/Q3/A5
ID/W6/Q3/A6
etc.

. . . until the values are repeated. This typically occurs, or can be made to occur after a number of complete cycles of the lowest frequency, by slightly modifying the frequency values if necessary.

Other sequences of control words are possible, each with their advantages and disadvantages. Note that the values of W keep on changing but represent the sines and cosines of the analyzing functions at the (real) time at which the samples are taken. (TRNN clock time is real time and is normally generated in hardware.)

In what follows, the discussion will focus more specifically on the case where Coincidence Detector (3) is a multiplier. This is advantageous in frequency spectrum analysis applications. When Coincidence Detector (3) is a multiplier the algorithm implemented by the TRNN is described by the following algorithm:

$$(IN \times W) + (A \times Q) \rightarrow A$$

This can also be expressed as the following difference equation:

$$A_{n+1} = (IN \times W) + (A_n \times Q)$$

where n represents a time reference or "stamp." $A_n$ stands for the contents of neuron A at the beginning and $A_{n+1}$ the contents of neuron A at the end of the machine cycle. In what follows, the algorithm will also be referred to as the VDH Algorithm or the transfer function of the VDH Neuron.

The first product (IN×W), which deals with the multiplication of an incoming signal by a locally provided sinusoidal reference signal W, also describes what takes place in a heterodyne mixer. In a heterodyne mixer, the incoming signal is referred to as a "carrier wave" and the locally generator reference the "local oscillator." It can thus also be said that the TRNN emulates a network made up of a plurality of heterodyne mixers.

The implications are significant. Heterodyne mixers have been used since the dawn of electronics. They are now also used in modern scanning frequency spectrum analyzers. The difference is that modern scanning spectrum analyzers each use only a single heterodyne mixer and provide a local oscillator which generates a plurality of frequencies in succession whereas the VDH Neuron simultaneously provides a plurality or reference signals W. Another difference is that state of the art scanning spectrum analyzers lose phase information, whereas the VDH Neuron does not. This is because, in the language of heterodyne mixers, the VDH Neuron is a special case where the frequency of the "local oscillator" is the same as that of the "carrier wave," and so its mixer (multiplier) functions as a phase detector.

Analog circuits are generally much more cumbersome, but in some cases their use is justified because they are considerably faster. Where only a small number of frequency channels are needed their use may also result in a simpler overall system.

Figure 2:
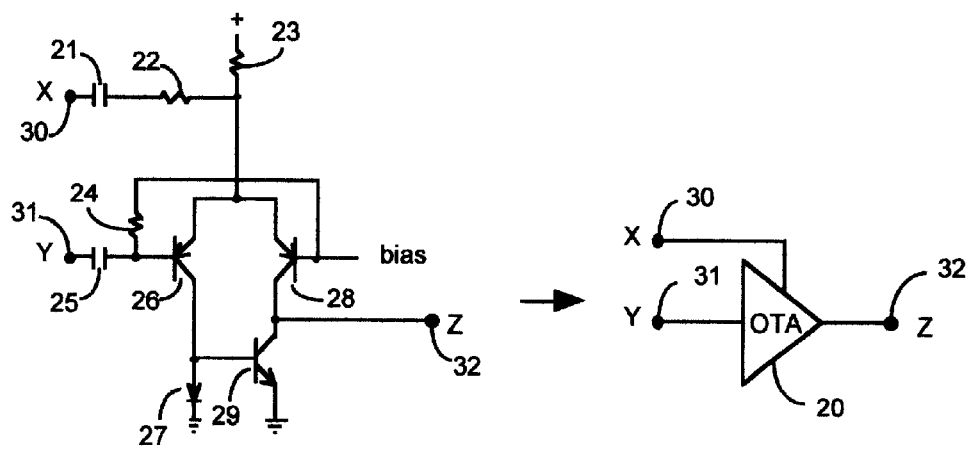
FIG. 2 illustrates a variation using analog circuits and details some of the key analog components.
Figure 2:
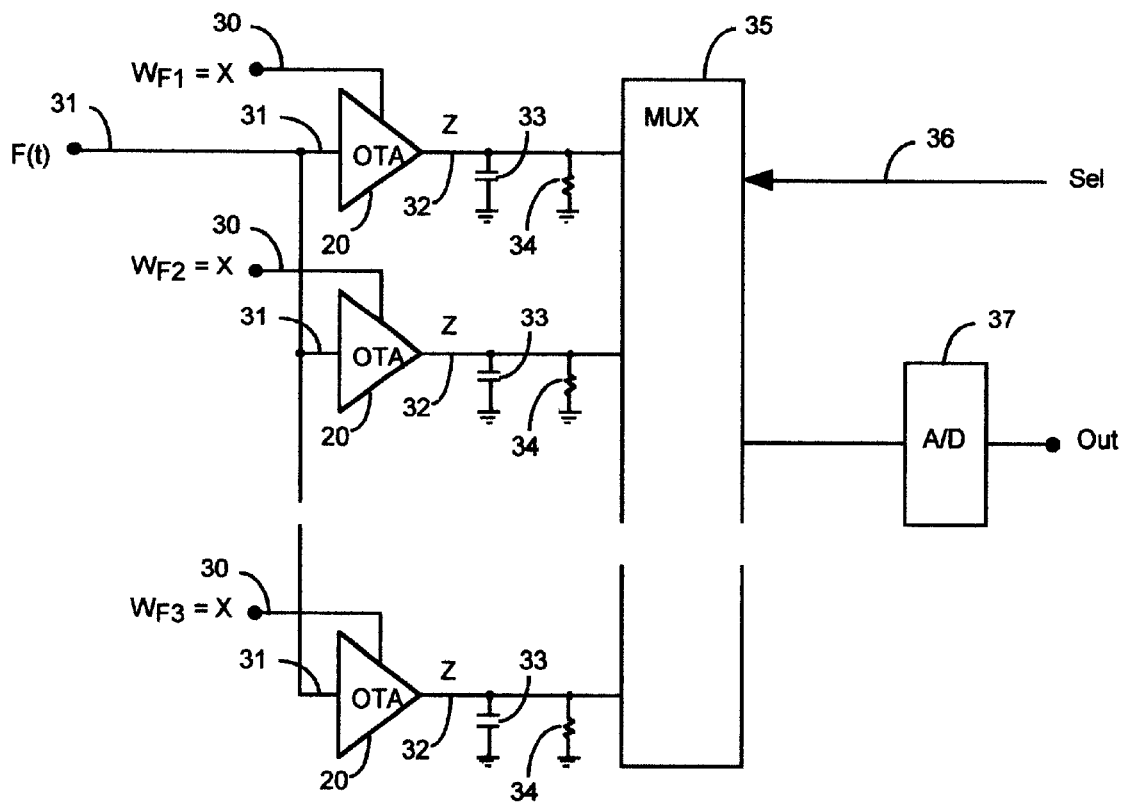

FIG. 2 illustrates a version of the TRNN that uses a plurality of analog circuit multipliers (20). A preferred choice for analog multiplier (20) is the circuit known as an Operational Transconductance Amplifier (OTA) whose internal structure is shown, in simplified form, to consist of components (21) to (29). This classic circuit, in addition to being simple, has the advantage of providing an output in the form of a current source. Transistors (26) and (28) form a differential pair and diode (27) and transistor (29) a current mirror. Output Z (32) is the node where the collectors of transistors (28) and (29) are joined. Capacitors 21 and 25 are used to provide DC isolation and solve biasing problems. In more sophisticated analog multipliers, voltage translating circuits are used instead, but at the cost of added complexity and slower operation. The current available at output Z (32) represents the product of inputs X (30) and Y (31) and is not significantly influenced by the magnitude of the voltage at output Z (32). This current sourcing characteristic makes it possible to obtain an integrator merely by loading output Z (32) with a capacitor (33). Furthermore, the addition of a resistor (34) across capacitor (33) results in a lossy integrator and, by replacing the resistor by a circuit that is the equivalent of a variable resistor, an adjustable loss factor Q can also be implemented.

A network consisting of a plurality of analog heterodyne mixers/phase detectors can be constructed by using a plurality of multiplier circuits as previously described with one input Y (31) tied to a common source of input signals F(t) (31). Each other input X (30) is tied to a different sine wave source tuned to a different frequency of interest. In the preferred version of the analog network, two such multiplier/integrator circuits are used for each input frequency component of interest and form a frequency channel pair. The first multiplier/integrator of the pair has circuit elements (33) and (34) for lossy storage of an in-phase ("real") component and the second circuit elements (33) and

(34) for lossy storage of a quadrature ("imaginary") component. The first multiplier/integrator is associated with a sine-wave generator that generates the in-phase reference/weighting factor and the second a sine-wave generator that generates the quadrature of phase reference/weighting factor. Such an arrangement makes it is possible to obtain a continuously updated phasor with both amplitude and phase information for one frequency component of the input signal F(t) (31). (The same would be true of a digital version of the circuits of FIG. 1.) This will be explained in greater detail later on.

Each capacitor (33) is a neuron and can be accessed directly or through selecting circuits (35), for instance a multiplexer circuit MUX. In each case a high input impedance buffer will be needed to prevent additional, unwanted loading of capacitor (33). When selecting circuits (35) are used, the selection signal (36) is the equivalent of neuron address A. Another option is the addition of an Analog to Digital Converter (37) to convert the analog value stored by neuron capacitors (33) to a digital format.

It is possible to contemplate single or multiple combinations of coincidence detectors, multipliers and other circuits made up of analog and/or digital circuits. In some of these implementations the circuit elements (for instance, the multipliers) will be shared, and in some others, not.

In the preceding discussion it has been stated that for frequency spectrum analysis it is preferred to use two VDH Neurons per frequency component of the incoming signal at (11). It was also stated that for frequency spectrum analysis Coincidence Detector (3) is preferably a multiplier. A more detailed analysis and enabling details of the VDH Neuron pair in frequency spectrum analysis are presented in what follows. When properties common to both neurons of the pair are discussed, they will be given in reference to Neuron A and weighting factor W. When they differ, a distinction will be made. The first VDH Neuron of the pair will still be referred to as neuron A but the associated weighting factor will be designated $W_a$. The second VDH Neuron will be designated as neuron B and its associated weighting factor as Wb. The case of digital or discrete signals is the least obvious and so it will be discussed in what follows. The circuits and nomenclature are as shown on FIG. 1.

For each neuron of the VDH Neuron pair Weighting factor W is a succession of discrete samples of a sine or cosine wave whose frequency is variously known as the center frequency, the reference frequency or the frequency of the frequency "channel" represented by the neuron pair. At the reference frequency the first product (IN×W) is the product of two sinusoidal functions at the same frequency and the result is a sinusoidal function at half the amplitude and twice the frequency, with an average (DC) level that varies as a function of the phase relationship between IN and W. When the frequency of the incoming signal at (11) deviates from that of the center frequency the first product yields a sinusoidal function whose frequency is the sum of the incoming frequencies superposed on a low frequency level which is itself a sinusoidal wave at the difference frequency. Because of the filtering action of the neuron in the second product ($A_n \times Q$) the component at the sum frequency is attenuated and appears as a "ripple." It can be either ignored or filtered out by decimation or other simple methods, typically in a subsequent neural "layer." This will be explained in further detail later on.

The lossy integrator is best understood from the point of view of a difference equation. The second product (A×Q) can then be seen as the remaining value in the neuron prior to the arrival of each new sample. The corresponding loss (or gain) of energy increases in proportion to the magnitude of A. Successive multiplication of a quantity A by the same multiplier Q, as is typical for the same frequency channel, results in a product which is an exponential function. This exponential function has a time-constant associated with it. Equilibrium is reached when A times (1−Q) is equal to IN times W. Transitions from one steady state level to another are also exponential, much like like the envelope of the waveform describing the oscillations in an analogous electronic circuit made up of a capacitor in parallel with an inductor. The neuron responds like a tuned circuit. When the value of Q increases and approaches unity, gain, time-constant and selectivity increase.

The preferred representations of the VDH algorithm or transform which describes the performance of the VDH Neuron include the following pair of difference equations:

$$A_{n+1} = (IN \times W_a) + (A_n \times Q) \tag{e1}$$

$$B_{n+1} = (IN \times W_b) + (B_n \times Q) \tag{e2}$$

Where n is the order in which a sample was taken,

A is the content of a neuron or node, represented by a memory location at address A, B is the content of a neuron or node, represented by a memory location at address B, IN is a sample from any waveform in real time (for instance, the output of a microphone), $W_a$ is a weight factor associated with input IN and neuron A, $W_b$ is a weight factor associated with input IN and neuron B and Q is a gain factor normally less than unity related to the "Quality Factor" of a resonant circuit.

Note that all of the above quantities can vary from sample to sample and for each neuron pair or frequency of interest. Furthermore, when $W_a$ and $W_b$ are in quadrature of phase (for instance, samples of a sine and a cosine wave respectively) then the neuron pair of equations (e1) and (e2) stores a complex quantity made up of a real component in A and an imaginary component in B.

Normalization to emulate filter banks with constant bandwidth is accomplished by scaling the weight factor (parameter W) and the loss factor (parameter Q). The complete expression for the response of a normalized VDH neuron is $$A_{n+1} = (IN \times W_a) \times (F_a/F_s) + (A_n \times Q \exp(F_a/F_s))$$

and $$B_{n+1} = (IN \times W_b) \times (F_a/F_s) + (B_n \times Q \exp(F_a/F_s))$$

Where $F_a$ is the center frequency and $F_s$ the sampling frequency. Normalization is intended to keep constant the net gain and loss of a neuron when the number of samples of the incoming signal at (11) per cycle of the reference frequency varies. When the number of samples per period of the reference frequency increases, the weighting factor W is decreased by a proportion $F_a/F_s$ so that the total quantity added to the contents of the neuron per period of the input at (11) at the center frequency remains the same. At the same time, the loss per period is also kept constant by changing the the value of the exponent of loss parameter Q from unity to $F_a/F_s$, resulting in a smaller loss per sample when the sampling frequency increases. Computational shortcuts will be explored in greater detail in what follows.

The transformation using the pair of equations (e1) and (e2) yields results that are remarkably similar to that of classical filters. However in classical filters phase information is lost or difficult to predict. This is not the case when using the VDH transformation.

The contents of neurons A and B accurately represent the real and imaginary coordinates of a phasor that describes both the amplitude and phase of incoming signal components with respect to the analyzing frequency (i.e., the frequency of the sinusoids representing the weighting factors). The more the incoming component frequency deviates from the analyzing frequency, the faster the phasor rotates and the smaller its magnitude becomes. When the incoming frequency component is lower than the analyzing frequency the phasor rotates clockwise; otherwise it rotates counterclockwise.

The accuracy of the phasor is such that the original frequency signal can be reconstructed with phase and amplitude characteristics intact. This is done by associating a plurality of modulators (for instance multipliers) with a plurality of neurons in such a way that the output of a given neuron is fed to one input of the associated modulator. At the same time a sine wave at the frequency and phase of the weighting factor W of the neuron is fed to the other input of the same modulator. The output of the modulator will then be the reconstructed frequency component in the input at (11). Care should be taken however to insure that the bandwidth of adjacent frequency channels is commensurate with their spacing, otherwise errors in reconstruction will be significant. In other words, bandpasses should overlap, typically at the 3 db point of the response curves of two successive frequency "channels." Interesting, special effects can be obtained by modulating a different frequency than that of the weighting factor of the associated neuron. This makes it possible to transpose the frequency components of the input signal at (11) into a different musical key or in a portion of the frequency spectrum that can be perceived more easily by the human ear. This may have advantages in auscultation for the improved recognition of heart sounds in medicine or machinery sounds in industry. Frequencies can also be relocated individually so that their intervals lead to more harmonious effects, "bunched" or separated as desired, etc. etc.

In what follows, further enabling practical details and shortcuts are presented. Only the case of a digital hardware configuration and serial processing as previously discussed will be considered, with the understanding that other combinations and methods are possible. Indeed the two multiplications and one addition performed for each neuron can be executed in hardware and/or software, in sequence or in parallel, by analog or digital circuit elements, or a hybrid combination thereof. Worst case required processing speed is $$CPS=F_s \times N_f \times 2$$

where

CPS is the number of TRNN cycles per second as defined in relation to FIG. 1, $F_s$ is the input sampling frequency, $N_f$ is the number of frequencies in the filter bank and 2 is the number of neurons per frequency channel.

A practical example follows, with modest performance requirements for the purpose of simplicity. Consider a frequency spectrum that covers a range of frequencies between 110 Hz (A2 on the piano well-tempered scale) and 880 Hz (A5 on the piano well-tempered scale) in three octaves. There are twelve notes or frequencies per octave for a grand total of 37 frequency channels. Also $$F_{n+1}/F_n=1.0595 \text{ (i.e., the twelfth root of 2)}$$

Which corresponds (approximately) to a quality factor of $$Q_r=1/0.0595=16.82 \text{ (a value of 20 is used for convenience)}$$

Which in turn approximately corresponds to a loss factor Q=0.95

The required real-time processing speed, expressed as TRNN operating cycles per second, would be $$CPS=F_s \times N_f \times 2=(4 \times 880) \times 37 \times 2=260.5 \text{ KHz}$$

which is trivial in terms of what can be done in hardware and even software. Note that the chosen sampling frequency $F_s$ used here is four times the highest input frequency. The theoretical minimum is two samples per cycle of the highest frequency.

It has already been pointed out that the same input sample must be used for computing the real and imaginary outputs of a given neuron pair in order to avoid a time displacement between the real and imaginary components. Otherwise the resulting error will become more significant as the analyzing frequency approaches the sampling frequency.

Lookup tables have already been mentioned several times in connection with weighting functions. The size of these lookup tables, in terms of the total number of words, can be limited because the values of parameters W, Q and A are continuously repeated for a given filter bank with specific frequencies and selectivities. Care must be taken that the no sudden phase-shifts are generated in the weighting functions when making the (cyclic) transition between the end of the table and its beginning. Sudden phase shifts in either the input or the weighting function produce a transient that the ear interprets as a "click." The configuration of the filter bank (i.e., the selectivity, number and values of the individual frequency channels) can be changed instantly by switching to a different set of lookup tables.

Interruptions in the processing of samples can be tolerated as long as they are kept short and as long as the phase of the (sinusoidal) weight factors is maintained. Dynamic range must be considered carefully as it holds some surprises. As is well known in audio applications, frequency components in a given sound waveform will add up in phase at random intervals, thereby causing large amplitude excursions, and each neuron must be able to encompass a range of values that is typically between one and two orders of magnitude larger than the signal to be analyzed.

In connection with the normalization process previously discussed, differentiation of the input signal at (11) has the same approximate effect as multiplying each weighting factor by the normalization factor $F_a/F_s$. The same sine and cosine tables can then be used for all weighting factors. One must however remember that the differentiator causes an apparent phase-shift in all incoming signal components which is constant at 90 degrees. Ripple and noise are also affected.

Computational errors can result from trying to obtain small differences between two large numbers. Indeed, this is what happens when the value of Q approaches unity. The problem is aggravated at the lower frequencies, when the loss per sample due to parameter Q is further reduced. In addition to the previously discussed method of subtracting a scaled-down version of the contents of the neuron from said contents of the neuron it is also possible to alternate between two or more values of Q, one or more of these values typically being unity (with no resulting loss).

In the preceding discussion, it has been mentioned that neurons can be connected to each other in successive "layers." For each neuron A of the first layer signal input at (11) is connected to a source of signals (8). For each neuron of the second layer the signal input at (11) is connected to a neuron A of the first layer. For each neuron of the third layer the signal input at (11) is connected to a neuron of the second layer, and so on. When inputs at (11) are connected to different sources, a Multiplexer (15) or an equivalent circuit can be used to change the connections and route the signals as needed. Individual neurons are accessed in a conventional way through Data Port (13) of Shared Memory (4) in which the memory elements (neurons) with address A are contained. As previously explained, Stimulator circuits (10) or portions of the ID parameter can be involved in the generation of address signals A of neurons in a previous layer or separate logic circuits can be used. The different "layers" of neurons can consist of groups of neurons in the same or a plurality of TRNN engines as shown on FIG. 1. The preferred arrangement is to use a separate TRNN engine for each layer. In some applications it may also be advantageous to use a neuron memory (4) which is multiported, i.e., where more than two users can read the contents of a given neuron at the same time. While cumbersome, the necessary circuits are well within the state of the art, and pose no special problem in view of the fact that the number of neurons associated with a given TRNN is typically expected to be less than 256. The latter value is typical of the smallest and fastest random access memories commercially available.

A neuron can be used to filter out the ripple or other undesired signal in the output of a previous neuron. Neural filtering methods can include decimation and strategic sampling and holding. Decimation consists of ignoring one or more signal samples at set intervals of time. Strategic sampling and holding means sampling and holding the output only when a certain condition is met, for instance when the ripple value is maximum, when the weighting factor W has reached a certain value of phase, etc. A simple and effective smoothing filter can be obtained with $W=1/N$ and $Q=(N-1)/N$, where N is the same constant throughout. Reasonable values of N (10 is a representative number) result in a delay that is insignificant for all practical purposes and have no effect on long term magnitude and phase.

From the foregoing it is clear that the VDH Neuron can be used for other mathematical purposes besides recognition tasks. SAR (Synthetic Array Radar) imaging is an example where the same algorithm can be used.

I claim:

1. A TRNN algorithmic engine for neuron-like computing comprising:
   a source (1) of a weighting parameter W, a growth or decay parameter Q and an address parameter A;
   a source of signals (2);
   a coincidence detector (3) for generating at its output a high value when a signal from said source of signals (2) available at its first input and said parameter W available at its second input are approximately equal;
   a shared memory (4) containing a plurality of memory elements with address A, each memory element constituting a neuron capable of storing a multivalued quantity, said each memory element also capable of being written to or read from at the same time by a plurality of users by means of a plurality of data buses, each data bus being associated with its own address bus;
   a latch (5) for holding at its output a value previously supplied at its input and representing previous contents of one of said neurons;
   a multiplier (6) for generating at its output an arithmetic product of said parameter Q available at its first input and said output of latch (5) available at its second input;
   an adder (7) for generating at its output an arithmetic sum of said output of coincidence detector (3) available at its first input and said output of multiplier (6) available at its second input;
   a switch (17) for gating said output of adder (7) to one of said plurality of data buses (14) of said shared memory (4);
   means for connecting said source of signals (2) to said first input of said coincidence detector (3);
   means for connecting said parameter W to said second input of said coincidence detector (3);
   means for connecting said parameter Q to said first input of said multiplier (6);
   means for connecting said parameter A to one of said plurality of address busses of said shared memory (4) associated with said data bus (14) for selecting a said neuron;
   means for connecting said data bus (14) of said shared memory (4) to said input of latch (5);
   means for connecting said output of latch (5) to said second input of multiplier (6);
   means for connecting said output of coincidence detector (3) to said first input of adder (7);
   means for connecting said output of multiplier (6) to said second input of adder (7);
   means for connecting said output of adder (7) to said input of switch (17);
   means for connecting said output of switch (17) to said first of said plurality of data busses (14) of said shared memory (4); and
   control circuits (16) and means for connecting said control circuits (16) to said source (1) of parameters W, Q and A, said shared memory (4), said latch (5) and said switch (17) for
   causing a new value of said parameter W, a new value of said parameter Q and a new value of said parameter A to become available from said source (1),
   causing a value previously stored at said new address A in said shared memory (4) to be read out and causing it to be held in said latch (5), and
   causing said sum generated at said output of adder (7) to be connected by means of said switch (17) to said data bus (14) of said shared memory (4) and causing said sum to be stored as an updated value in said shared memory (4) at said new address A.

2. The invention of claim 1 wherein said output of adder (7) is stored in said shared memory (4) after said value previously stored has reached said input of adder (7).

3. The invention of claim 1 wherein an additional parameter ID is supplied by said source (1) to said source of signals (2) for selecting one of a plurality of sources of signals.

4. The invention of claim 1 wherein succeeding values of said parameter w associated with any given said neuron are repeating values.

5. The invention of claim 1 wherein said source of parameters W, Q and A is a lookup table.

6. The invention of claim 1 wherein said coincidence detector (3) includes a subtractor.

7. The invention of claim 1 wherein said coincidence detector (3) is a lookup table with precomputed values.

8. The invention of claim 1 wherein said coincidence detector (3) is a multiplier.

9. The invention of claim 1 wherein a complete frequency channel comprises a first said neuron associated with a first said parameter W=Wa and a second said neuron associated with a second said parameter W=Wb such that Wa and Wb are identical sinusoidal waves in quadrature of phase.

10. The invention of claim 1 wherein succeeding values of said parameter Q associated with a given said neuron consist of a repeating sequence of two or more values.

11. The invention of claim 1 wherein said multiplier (6) is replaced by a means for subtracting from said neuron a fraction of said value previously stored.

12. The invention of claim 1 wherein said coincidence detector (3), said memory (4), said latch (5) for temporarily holding, said multiplier (6) and said adder (7) are replaced by a plurality of analog multipliers and lossy integrators (20), (33) and (34).

13. A time referenced neural method of computing comprising the steps of:

providing a storage location typically representing a neuron in which is stored a previous value;

providing a reference parameter value W;

providing a gain or loss parameter value Q;

providing an input signal value;

generating a coincidence value which is high when said input signal value and said reference parameter value W are approximately equal;

multiplying said previous value stored in said neuron by said parameter value Q to obtain a modified quantity;

adding said coincidence value to said modified quantity; and in said storage location or neuron replacing said previous value by the sum of said coincidence value and said modified quantity.

14. The method of claim 13 wherein succeeding values of said parameters W, Q and A recur in a continuously repeating pattern.

15. The method of claim 13 wherein said step of generating a coincidence value is accomplished by multiplying said input signal value by said parameter W.

16. The method of claim 13 wherein said parameter W and said parameter Q have values 1/N and (N−1)/N respectively and cause an associated said storage location or neuron to act as a smoothing filter.

17. The method of claim 13 wherein said gain or loss parameter Q associated with a given neuron is a repeating sequence of two or more different values to effect decimation and sample and holding, and reduce computational errors.

18. The method of claim 13 wherein said input signal value is a sample of an input function after differentiation in order to help normalize said coincidence value.

19. The method of claim 13 adapted for frequency spectrum analysis in which the values obtained for a first said neuron and a second said neuron represent outputs for one frequency channel, and in which said method steps are carried out twice, once with first said neuron associated with a first said parameter W consisting of samples from a reference sinusoidal wave in phase, and once with second said neuron associated with a second said parameter W consisting of samples from a reference sinusoidal wave at the same frequency but in quadrature of phase.

20. The method of claim 19 wherein said parameters W and Q are modified so as to keep constant the net gain or loss in said first and second neurons during one cycle of said first or second parameter W.

* * * * *